United States Patent Office 3,301,440
Patented Jan. 31, 1967

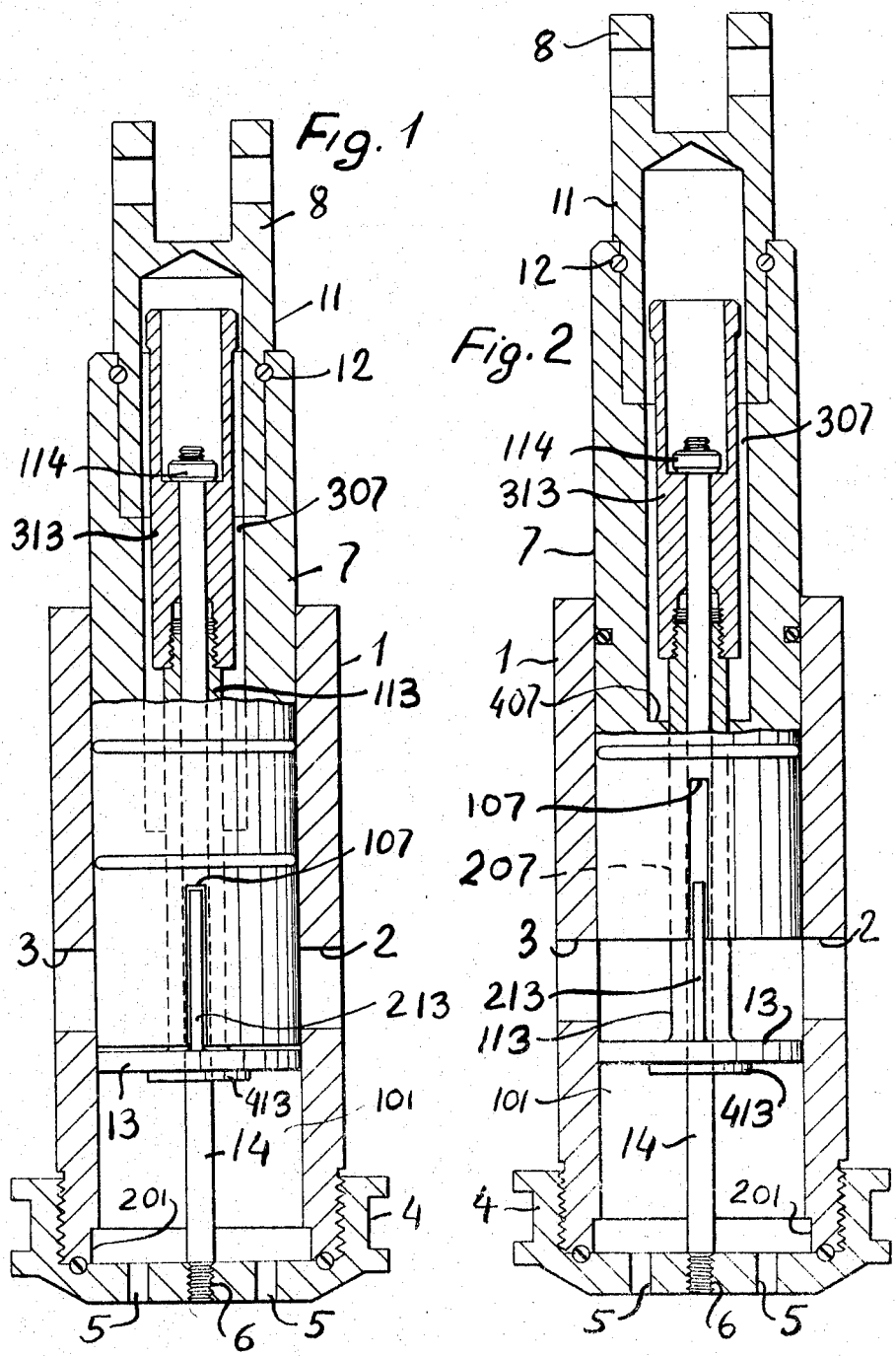

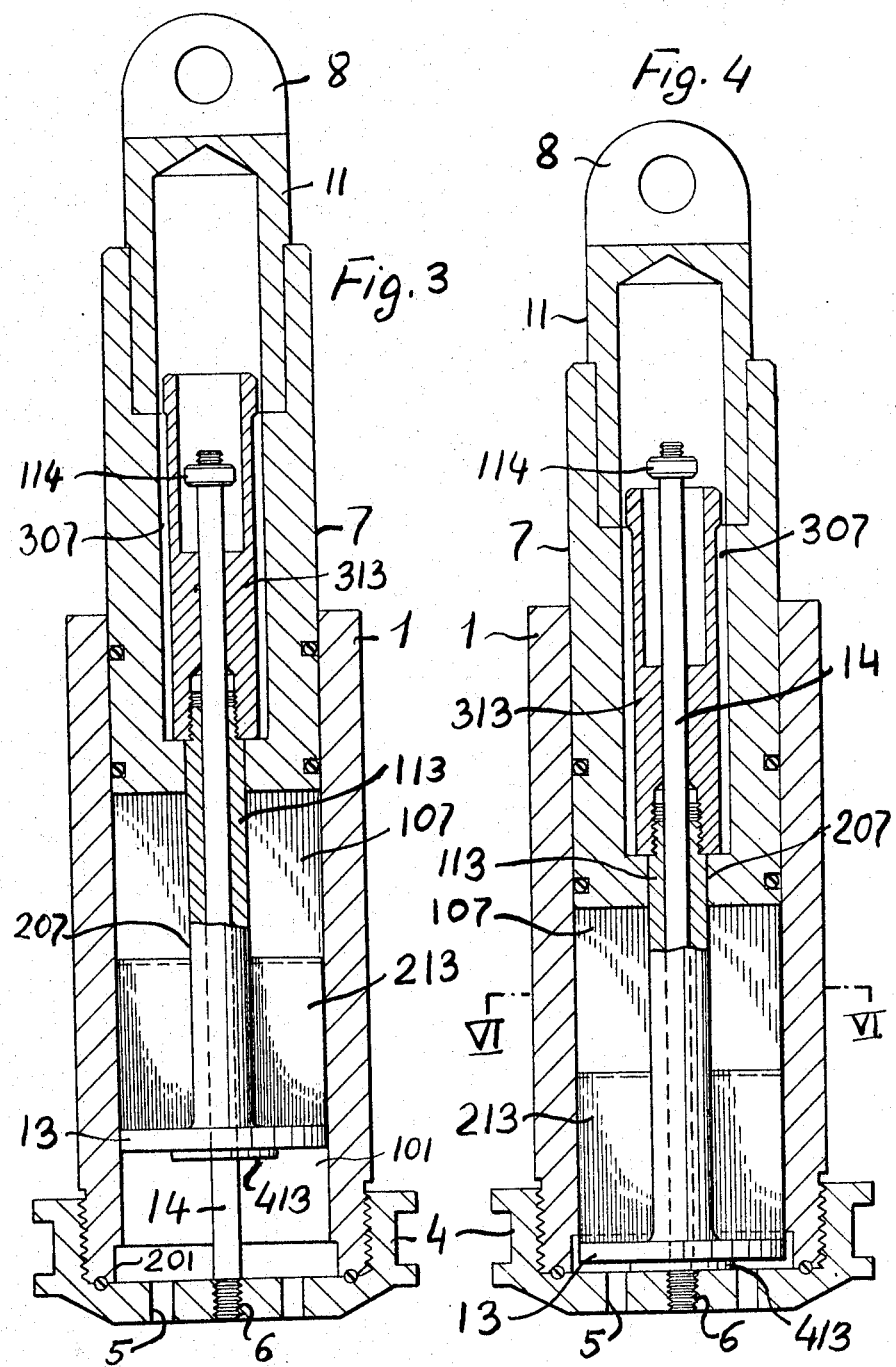

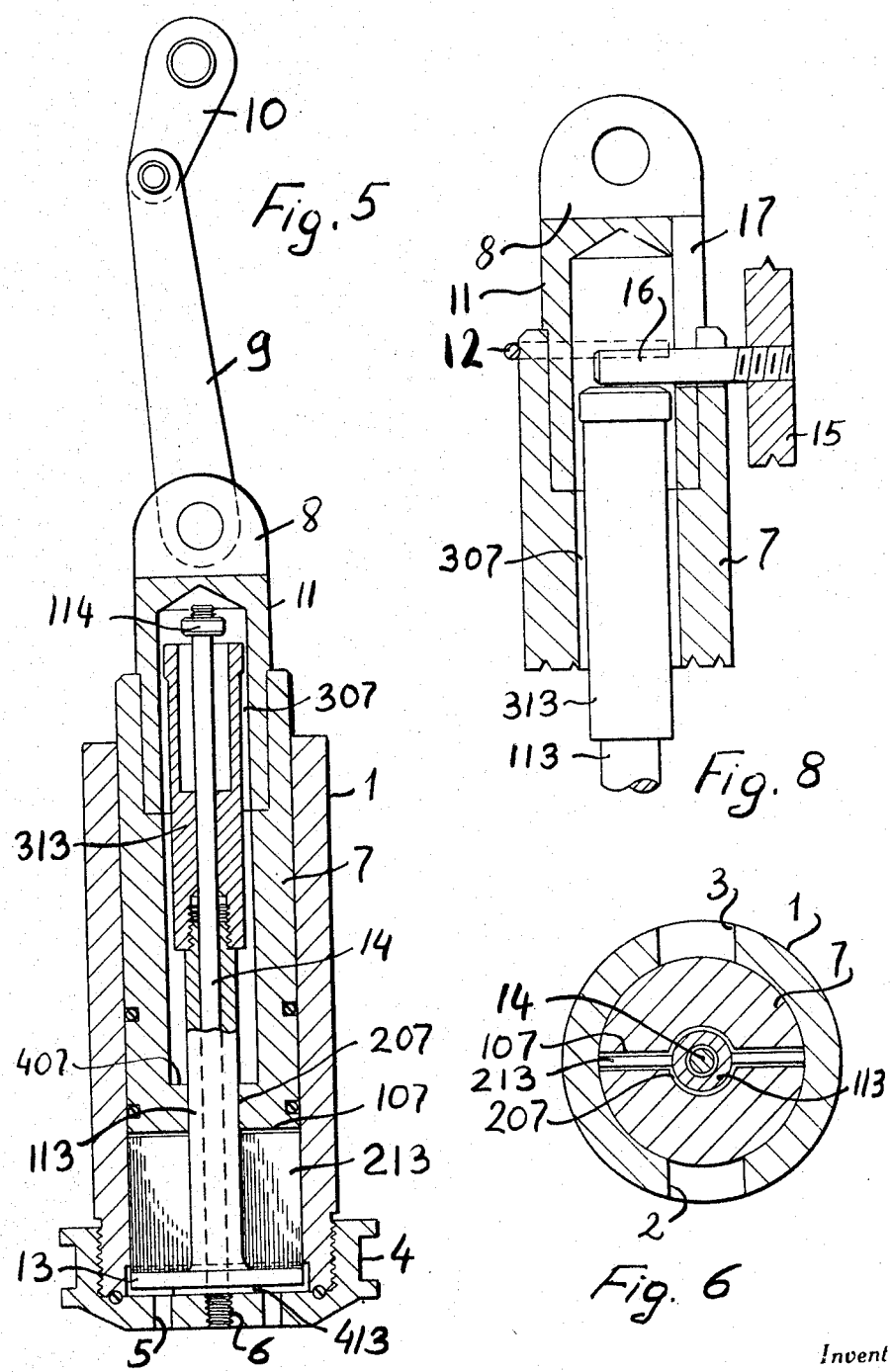

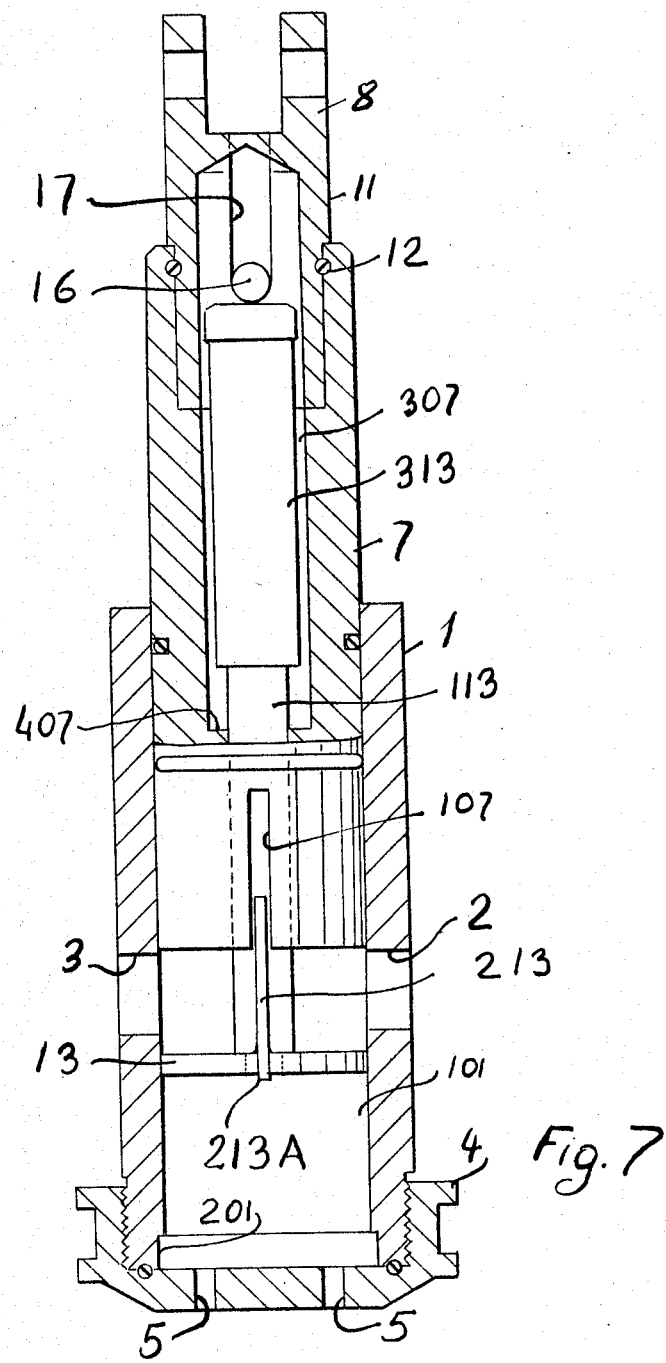

3,301,440
MULTI-PISTON COCK ADAPTED FOR THE SIMULTANEOUS DOSING OF A PLURALITY OF DIFFERENT-FLAVORED ICES, OR THE LIKE
Poerio Carpigiani, Bologna, Italy, assignor to APAW S.A., Fribourg, Switzerland
Filed Sept. 9, 1965, Ser. No. 486,041
Claims priority, application Italy, Sept. 15, 1964, 19,783/64
5 Claims. (Cl. 222—135)

This invention relates to multi-piston dosing and dispensing cocks for pasty products, such as soft ice cream, of the kind described in my prior Patent No. 3,149,756 of which the present invention constitutes an improvement and its object is to provide an improved dosing and dispensing multi-piston cock, provided with two co-axial pistons, which will be called a working piston or plunger and a dosing piston, respectively, said pistons having different strokes, and which presents, over my prior cock, the following main advantages:

(1) Reduces practically to nil the clearance space around the working plunger in which some residual ice cream can stagnate after each dispensing operation.

(2) Permits, if required, the simultaneous dispensing of more than one flavored ice cream, by possibly dividing the chamber above, and possibly below, the dosing piston into a number of cylindrical sector-shaped chambers.

Other objects and advantages will be apparent from the following specification of two preferred embodiments of an improved multi-piston multi-flavored ice cream-dosing and dispensing cock which, as said, substantially comprises, as in the patent of which the present constitutes an improvement, a working piston or plunger and a lower co-axial disc-like dosing piston mounted slidable independently for a certain length of a cylinder bore and slidable together for a certain length of their stroke, whereby the said working piston or plunger has a substantial thickness and serves as ice cream propelling and lower piston rod guide member, while the lower thin or disc-like piston, which may be termed "dosing piston" has a reduced thickness and is provided at its bottom with a slightly projecting spacing member or members, whereby the total length of the thickness of the dosing piston and adjoining lower spacing member is slightly less than the height of a shallow widened lower section of the corresponding cylinder, which lower section terminates with a bottom wall provided with product outlet port or ports.

Furthermore, according to the invention, whenever it is desired to dispense two or even more different flavors of ice cream, the space between the said two pistons is divided into a corresponding number of cylindrical sector-shaped chambers formed by providing on the top face of said dosing piston a corresponding number of partition blades adapted to slide with their edges in contact with the cylinder walls and into and out of corresponding sheath-like slits in the working plunger. Thus when this plunger is shifted towards the dosing piston at the lower end of its stroke, the ice cream trapped between said two pistons is squeezed around the edges of said lower or dosing piston and through the said outlet ports through each of which a different flavored ice cream can be dispensed.

The manner of performing the above improvements as well as other objects and advantages will be apparent from the following specification made with reference to the accompanying drawings, in which:

FIG. 1 is an axial vertical section through a first embodiment of multi-piston cock adapted for the simultaneous measuring and dispensing of two varieties of ice cream, with the lower or dosing piston in its upper position and the working piston or plunger in an adjacent position;

FIG. 2 is a like section through the same multi-piston cock and in which the working plunger is in proximity to the top of its stroke, while the dosing piston is spaced thereunder;

FIG. 3 is an axial section on a plane at 90° to the section plane of FIG. 2, and in which the working plunger is in its top position while the dosing piston is in its position of maximum distance from the working plunger;

FIG. 4 is an axial section on the same plane as FIG. 3, showing the dosing piston in its lower position, and the working plunger in its position before the extrusion of the ice cream;

FIG. 5 is a section similar to that of FIG. 4 but including the piston-operating means, both pistons being at their lower position i.e. after the extrusion of the ice cream;

FIG. 6 is a horizontal cross section on line VI—VI of FIG. 5;

FIG. 7 is an axial section through a second embodiment of multi-piston cock, the two pistons being shown in the same position as in FIG. 2, and FIG. 8 is a section of the top part of the cock shown in FIG. 7, on a plane at 90° to the section plane of said FIG. 7.

In the embodiment as shown in FIGS. 1 to 4 of the drawings, the multi-piston dosing cock comprises a substantially vertical hollow cylinder or barrel 1 the bore 101 of which has at the bottom thereof a very short counterbored setcion 201 having a substantially larger diameter than the bore 101. The barrel section 201 is closed by a cap 4 provided with a number (two in the embodiment as shown) of outlet ports 5 corresponding to the number of ice cream flavors to be dispensed simultaneously.

Within said cylinder bore 101 two co-axial pistons 7 and 13 are slidably mounted with a tight fit: the lower piston 13 which is disc-like and which shall be termed the "dosing piston" and an upper piston 7 which has a length in excess of that of the barrel 1 and which shall be termed "plunger."

Plunger 7 has an axial lower through bore 207 and an axial upper counterbore 307 with an abutment step 407 therebetween. The lower part of said plunger 7 is solid and provided with radial slits 107, while the top part is provided with a second counterbore in which the driving member or plunger rod 11 is fastened as by keys 12. Rod 11 has an axial blind bore and is provided with lugs 8 for connection to the pin of a connecting rod 9 (see FIG. 5) driven by a crank 10.

The lower piston 13 is very thin or disc-like and is provided at its underside with a spacing member 413 which does not extend so as to obstruct outlet ports 5, even when said spacing member abuts cap 4, in which position, between the piston edges, its bottom face and the facing walls of the shallow counterbore 201 and cap a clearance space is left free, through which any ice cream present between spaced piston 13 and plunger 7 may be forced by said plunger around said piston 13 and dispensed through outlet ports 5.

Piston 13 is provided with an axially disposed tubular rod 113 slidably guided in plunger bore 207 and by a guide rod 14 secured, as by threads 6, to the center of cap 4. Tubular rod 113 has a screw-threaded end on which a thicker counterbored extension 313 is screwed, which is housed within the counterbore 307 of plunger 7 and in the adjoining blind bore of plunger rod 11.

Guide rod 14 projects beyond the bottom of the counterbore of piston rod extension 313 and is provided with a threaded end on which a nut 114, may be adjustably threaded. The nut 114 has such dimensions as to freely pass within the counterbore of piston rod extension 313 and, when piston 13 is in its lowermost position (FIGS. 4 and 5) nut 114 is spaced above the bottom of said counterbore by a length which corresponds to the chamber in cylinder 101 which is formed by the maximum spacing of piston 13 and plunger 7, and whose volume corresponds to the volume of one dose of product to be dispensed.

Piston 13 is also provided with a number of radial partition blades 213 which correspond as to number, length and angular position to the slits 107 in plunger 7, so that, when the plunger 7 is moved toward piston 13, blades 213 enter the slits 107 as in sheaths. By this means the corresponding cylinder bore 101 is divided into a number (two in the present case) of adjoining compartments, having the shape of cylindrical sectors.

A feed port is provided in the barrel 1 for each of said sector compartments and at a predetermined location longitudinally of said barrel. In the case as shown, there are two of such ports, 2 and 3, through which two different varieties of ice cream may be fed under pressure.

The operation is as follows:

Assuming the dosing cock is in the position shown in FIG. 5, which corresponds to the position just after the extrusion of measured amounts of ice cream, the revolving crank 10 lifts the plunger 7 which entrains by friction and adherence of the adjoining faces, the underlying piston 13 until the bottom of the counterbore of rod extension 313 abuts against nut 114. This happens when piston 13 comes to be a little below ports 2 and 3 (FIG. 1). By further rotating crank 10, plunger 7 is further driven upwardly until it fully uncovers ports 2 and 3, while piston 13 is maintained below said ports, due to the abutment of nut 114 against piston rod extension 313. At this point, crank 10 is at its upper dead centre.

In the meantime, ice cream is fed through ports 2 and 3 into the two chambers formed by the spaced piston 13 and plunger 7 and partitions 213 in bore 101 and by being injected under pressure the ice cream forces piston 13 downwardly, until the projecting lower part of stem extension 313 abuts against step 407 of counterbore 307 (FIG. 3). In this position the chambers between piston 13 and plunger 7 contain two half doses of two varieties of ice cream to be mixed dispensed together through ports 5, as two flavors of ice cream. Further rotation of crank 10 forces the plunger 7 and piston 13 downwardly simultaneously until spacer 413 beneath abuts cap 4 (FIG. 4).

By further rotating crank 10, plunger 7 is driven towards piston 13 and the ice cream contained therebetween is squeezed around the edge and lower face of piston 13 in shallow chamber 201 and through outlet ports 5 into an underlying container (not shown), until the plunger 7 comes into contact with piston 13, which takes place by the lower dead centre of crank 10. Thus the cycle is completed.

FIGS. 7 and 8 illustrate a slight modification of the just-described embodiment:

According to this modification, the piston rod 113 is guided only by the axial bore in the lower part of plunger 7 and by the partition fins or blades 213 in slits 107 and the upper abutment of the rod extension 313 is constituted by an abutment member or pin 16 fastened to an outer fixed part 15 or casing of the dosing dispenser and projects into the plunger rod extension 11 through a slot 17.

In this embodiment, the lower spacing member of piston 13 is constituted by a pair of short ribs 213A co-planar with blades 213. This substitution is also possible in the previous embodiments and serves for dispensing adjoining but separate ice cream flavors.

The operation is identical to that previously described, the only difference being that the fixed abutment 16 is fastened to an outer casing part 15, instead of the bottom of cylinder 1.

From the foregoing, it is apparent that the dosing multi-piston cock according to my prior patent has been substantially improved by constructing both plunger 7 and piston 13 of the same diameter, thus eliminating the intermediate counterbore having a greater diameter than the operating plunger and in which during the extrusion of the ice cream objectionable amounts of residual ice cream were left.

By this arrangement it is also possible to subdivide the space between piston and plunger into a number of separate cylindrical sectors, each in communication with one inlet and one outlet port.

I claim:

1. In a multi-piston measuring and dispensing cock, comprising a cylinder having a main bore and a shallow counter-bore of greater diameter at one end thereof, a closure member secured to said cylinder at the counter-bored end thereof and having at least one dispensing port therethrough, a dosing piston slidable in said main bore and having an abutment on its side facing said closure member and displaced laterally of said dispensing port, the thickness of said piston and abutment being less than the depth of said counterbore, an axially disposed rod fixed to the side of said piston opposite said abutment, a plunger slidable in said main bore and having an axial bore slidably receiving said rod, means on said plunger at its end opposite said piston for connection with reciprocal drive means for reciprocating both said plunger and said piston, said cylinder having at least one inlet port opening into said main bore, and abutment means fixed relative to said cylinder and limiting the stroke of said piston both relative to said cylinder and to said plunger so that said piston is stopped on one side of said inlet port and said plunger can be moved beyond said inlet port and spaced from said piston to define a measuring chamber therebetween and in communication with said inlet port, the improvement comprising said main bore having a uniform diameter throughout its length said piston and plunger having uniform diameters snugly fitting said main bore, and said abutment means being disposed in alignment with and engageable by the free end of said piston rod.

2. A multi-piston cock according to claim 1 wherein said plunger has a longitudinally extending slot in the end portion adjacent said drive connecting means, and said abutment means comprises a stop member projecting through said plunger slot into the path of said piston rod.

3. A multi-piston cock according to claim 1 comprising a guide rod fixed axially to said closure member, said piston rod having an axial bore therethrough and being slidably mounted on said guide rod, and said abutment means being mounted on the free end of said guide rod and engageable with the free end of said piston rod.

4. A multi-piston cock according to claim 1 wherein said piston has axially disposed partitions extending radially from said rod to the periphery of said piston and engaging the wall of said main bore to subdivide said measuring chamber into at least two segmental chambers, said plunger having radial slits corresponding in number and location with said partitions to slidably receive said partitions when said plunger is moved toward said piston to discharge material through said discharge port, said cylinder having a plurality of said inlet ports corresponding in number and location with said segmental chambers, whereby measured amounts of different fluid materials may be mixed and dispensed simultaneously.

5. A multi-piston cock according to claim 4 wherein said piston abutment comprises partitions aligned with said measuring partitions and dividing the space between said piston and closure member into separate dispensing chambers, said closure member having a plurality of said dispensing ports corresponding in number and location with dispensing chambers.

References Cited by the Examiner

UNITED STATES PATENTS 2,505,799  5/1950  Smith _____ 222—135
3,149,756  9/1964  Carpigiani _____ 222—137

SAMUEL F. COLEMAN, *Primary Examiner.*